US010547997B2

(12) United States Patent
Ji et al.

(10) Patent No.: US 10,547,997 B2
(45) Date of Patent: *Jan. 28, 2020

(54) FACILITATING VIRTUAL PERSONAL AREA NETWORKS

(71) Applicant: AT&T Intellectual Property I, L.P., Atlanta, GA (US)

(72) Inventors: Lusheng Ji, Randolph, NJ (US); Robert Raymond Miller, II, Convent Station, NJ (US); Jia Wang, Basking Ridge, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/385,679

(22) Filed: Apr. 16, 2019

(65) Prior Publication Data

US 2019/0246258 A1   Aug. 8, 2019

Related U.S. Application Data

(63) Continuation of application No. 15/965,437, filed on Apr. 27, 2018, now Pat. No. 10,306,446, which is a (Continued)

(51) Int. Cl.
*H04W 4/80* (2018.01)
*H04W 76/14* (2018.01)
(Continued)

(52) U.S. Cl.
CPC .............. *H04W 4/80* (2018.02); *H04L 12/00* (2013.01); *H04L 12/4641* (2013.01);
(Continued)

(58) Field of Classification Search
CPC ........................... H04W 4/008; H04W 76/023
See application file for complete search history.

(56) References Cited

U.S. PATENT DOCUMENTS 7,675,537 B2   3/2010   Wilson
7,957,697 B2   6/2011   Park et al.
(Continued)

OTHER PUBLICATIONS

Chandra, , "A Virtualization Architecture for Wireless Network Cards", A Dissertation presented to the Faculty of the Graduate School of Cornell University in Partial Fulfillment of the Requirements for the Degree of Doctor of Philosophy, Jan. 2006, pp. 1-183.
(Continued)

*Primary Examiner* — Tuan H Nguyen
(74) *Attorney, Agent, or Firm* — Guntin & Gust, PLC; Jay Anderson

(57) ABSTRACT

A system that incorporates teachings of the present disclosure may include, for example, a coordinator device having a memory, and a controller. The memory can have computer instructions, which when executed by the controller, causes the controller to facilitate establishing a first virtual personal area network with a first sensor by executing computer instructions associated with a first application profile, and facilitate establishing a second virtual personal area network with a second sensor by executing computer instructions associated a second application profile. The first application profile can be defined by a first protocol specification, while the second application profile can be defined by a second protocol specification. The first protocol specification can also be operationally distinct from the second protocol specification. Other embodiments are disclosed.

20 Claims, 6 Drawing Sheets

Related U.S. Application Data continuation of application No. 15/609,140, filed on May 31, 2017, now Pat. No. 9,986,372, which is a continuation of application No. 14/992,721, filed on Jan. 11, 2016, now Pat. No. 9,699,598, which is a continuation of application No. 13/306,548, filed on Nov. 29, 2011, now Pat. No. 9,264,238.

(51) Int. Cl.

| | |
|---|---|
| *H04L 12/46* | (2006.01) |
| *H04L 29/06* | (2006.01) |
| *H04N 21/4363* | (2011.01) |
| *H04L 12/00* | (2006.01) |
| *H04L 29/00* | (2006.01) |
| *H04W 84/18* | (2009.01) |

(52) U.S. Cl.
CPC .......... *H04L 29/00* (2013.01); *H04L 65/1016* (2013.01); *H04L 65/1046* (2013.01); *H04L 65/403* (2013.01); *H04N 21/43637* (2013.01); *H04W 76/14* (2018.02); *H04W 84/18* (2013.01)

(56) References Cited

U.S. PATENT DOCUMENTS

| | | | |
|---|---|---|---|
| 8,149,849 | B2 | 4/2012 | Osborn et al. |
| 8,355,718 | B2 | 1/2013 | Choo et al. |
| 2008/0008109 | A1 | 1/2008 | Ollis |
| 2008/0056261 | A1 | 3/2008 | Osborn et al. |
| 2009/0059919 | A1 | 3/2009 | Kim et al. |
| 2009/0094349 | A1 | 4/2009 | Smith |
| 2009/0141741 | A1 | 6/2009 | Kim |
| 2011/0023025 | A1 | 1/2011 | Eldering |
| 2011/0149983 | A1 | 6/2011 | Heo et al. |
| 2011/0202910 | A1 | 8/2011 | Venkatakrishnan et al. |
| 2012/0124367 | A1 | 5/2012 | Ota et al. |
| 2012/0166580 | A1 | 6/2012 | Koo et al. |
| 2012/0213098 | A1 | 8/2012 | Sun et al. |
| 2013/0009787 | A1 | 1/2013 | Ree et al. |
| 2013/0089027 | A1 | 4/2013 | Son et al. |
| 2016/0127861 | A1 | 5/2016 | Ji et al. |
| 2017/0272898 | A1 | 9/2017 | Ji et al. |
| 2018/0249314 | A1 | 8/2018 | Ji et al. |

OTHER PUBLICATIONS

Microsoft, , "Virtual WiFi—Connecting to Multiple IEEE 802.11 Networks with One WiFi Card", http://research.microsoft.com/en-us/um/redmond/projects/virtualwifi, website visited Oct. 10, 2011, pp. 1-2.

Smith et al., "Wireless Virtualization on Commodity 802.11 Hardware", WiNTECH 2007, Sep. 10, 2007, Montreal, Quebec, Canada; pp. 75-81.

Wikipedia, , "ZigBee", http://en.wikipedia.org/wiki/Zigbee; website last visited Nov. 1, 2011; 1 page.

Zigbee Alliance, , "ZigBee Specification Overview", http://www.zigbee.org/Specifications/ZigBee/Overview.aspx, website last visited Nov. 8, 2011; pp. 1-2.

500

FACILITATING VIRTUAL PERSONAL AREA NETWORKS

CROSS-REFERENCE TO RELATED APPLICATIONS

This application is a continuation of U.S. application Ser. No. 15/965,437, filed Apr. 27, 2018, which is a continuation of U.S. application Ser. No. 15/609,140, filed May 31, 2017 (now U.S. Pat. No. 9,986,372), which is a continuation of U.S. application Ser. No. 14/992,721, filed Jan. 11, 2016 (now U.S. Pat. No. 9,699,598), which is a continuation of U.S. application Ser. No. 13/306,548, filed Nov. 29, 2011 (now U.S. Pat. No. 9,264,238), which are incorporated herein by reference in their entirety.

FIELD OF THE DISCLOSURE

The subject disclosure relates generally to facilitating virtual personal area networks.

BACKGROUND

Bluetooth® and ZigBee® are open standards for establishing short range peer-to-peer communications, and personal area networks when three or more devices are present. The ZigBee Alliance, which created a suite of ZigBee standards, targeted ZigBee for applications that consume less power than Bluetooth devices. ZigBee personal area networks were also designed to be scalable thereby making it easier for a ZigBee personal area network to link to other ZigBee personal area networks.

Bluetooth, on the other hand, was not designed to be scalable. In Bluetooth personal area networks, a master device must maintain synchronicity between all Bluetooth devices operating in the personal area network. Although technically feasible, it would be difficult to link Bluetooth personal area networks together in a manner that maintains the Bluetooth devices of multiple personal area networks synchronized.

BRIEF DESCRIPTION OF THE DRAWINGS

Reference will now be made to the accompanying drawings, which are not necessarily drawn to scale, and wherein.

DETAILED DESCRIPTION

Figure 1:
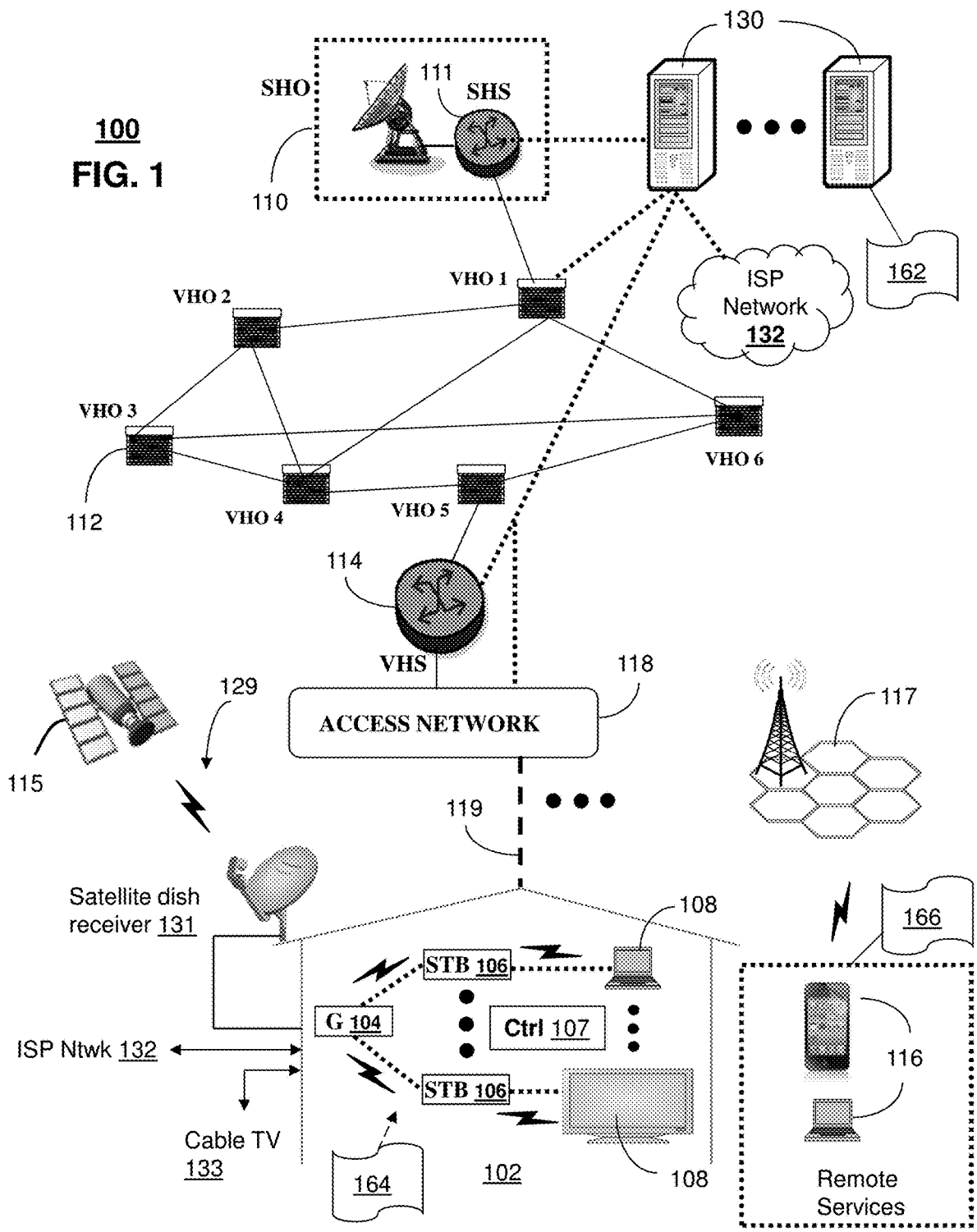
FIGS. 1-2 depict illustrative embodiments of communication systems that provide media services.

The subject disclosure describes, among other things, illustrative embodiments of virtual personal area networks, each adapted to a specific application profile, for selectively communicating with one or more devices according to their respective application profile. Other embodiments are contemplated by the subject disclosure as described below.

One embodiment of the subject disclosure includes a coordinator device having a memory, and a controller. The memory can have computer instructions, which when executed by the controller, causes the controller to facilitate establishing a first virtual personal area network with a first sensor by executing computer instructions associated with a first application profile, and facilitate establishing a second virtual personal area network with a second sensor by executing computer instructions associated a second application profile. The first application profile can be defined by a first protocol specification, while the second application profile can be defined by a second protocol specification. The first protocol specification can also be operationally distinct from the second protocol specification.

One embodiment of the subject disclosure includes a computer-readable storage medium having computer instructions, which when executed by at least one processor, causes the at least one processor to facilitate establishing a first virtual personal area network according to a first application profile and facilitate establishing a second virtual personal area network according to a second application profile. The first virtual personal area network can be configured to communicate with at least one of a plurality of first sensors operating according to a first type of application defined by the first application profile. The second virtual personal area network can be configured to communicate with at least one of a plurality of second sensors operating according a second type of application defined by the second application profile. The computer-readable storage medium can also have computer instructions that cause the at least one processor to facilitate establishing communications between the first virtual personal area network and the at least one of the plurality of first sensors by way of a physical layer and a medium access control layer, and facilitate establishing communications between the second virtual personal area network and the at least one of the plurality of second sensors by way of the physical layer and the medium access control layer.

One embodiment of the subject disclosure includes a method for facilitating establishing from a computing device a first virtual personal area network operating according to a first application profile, facilitating establishing from the computing device a second virtual personal area network operating according to a second application profile, facilitating establishing from the computing device communications between the first virtual personal area network and a first device over a communications interface, and facilitating establishing from the computing device communications between the second virtual personal area network and a second device over the communications interface. The first device is communicatively incompatible with the second virtual personal area network due to the first device conforming to operations defined by the first application profile, while the second device is communicatively incompatible with the first virtual personal area network due to the second device conforming to operations defined by the second application profile.

FIG. 1 depicts an illustrative embodiment of a first communication system 100 for delivering media content. The communication system 100 can represent an Internet Protocol Television (IPTV) media system. The IPTV media system can include a super head-end office (SHO) 110 with at least one super headend office server (SHS) 111 which receives media content from satellite and/or terrestrial communication systems. In the present context, media content can represent, for example, audio content, moving image content such as 2D or 3D videos, video games, virtual reality content, still image content, and combinations thereof. The SHS server 111 can forward packets associated with the media content to one or more video head-end servers (VHS) 114 via a network of video head-end offices (VHO) 112 according to a common multicast communication protocol.

The VHS 114 can distribute multimedia broadcast content via an access network 118 to commercial and/or residential buildings 102 housing a gateway 104 (such as a residential or commercial gateway). The access network 118 can represent a group of digital subscriber line access multiplexers (DSLAMs) located in a central office or a service area interface that provide broadband services over fiber optical links or copper twisted pairs 119 to buildings 102. The gateway 104 can use common communication technology to distribute broadcast signals to media processors 106 such as Set-Top Boxes (STBs) which in turn present broadcast channels to media devices 108 such as computers or television sets managed in some instances by a media controller 107 (such as an infrared or RF remote controller).

The gateway 104, the media processors 106, and media devices 108 can utilize tethered communication technologies (such as coaxial, powerline or phone line wiring) or can operate over a wireless access protocol such as Wireless Fidelity (WiFi), Bluetooth, Zigbee, or other present or next generation local or personal area wireless network technologies. By way of these interfaces, unicast communications can also be invoked between the media processors 106 and subsystems of the IPTV media system for services such as video-on-demand (VoD), browsing an electronic programming guide (EPG), or other infrastructure services.

A satellite broadcast television system 129 can be used also in the media system of FIG. 1. The satellite broadcast television system can be overlaid, operably coupled with, or replace the IPTV system as another representative embodiment of communication system 100. In this embodiment, signals transmitted by a satellite 115 carrying media content can be received by a satellite dish receiver 131 coupled to the building 102. Modulated signals received by the satellite dish receiver 131 can be transferred to the media processors 106 for demodulating, decoding, encoding, and/or distributing broadcast channels to the media devices 108. The media processors 106 can be equipped with a broadband port to the ISP network 132 to enable interactive services such as VoD and EPG as described above.

In yet another embodiment, an analog or digital cable broadcast distribution system such as cable TV system 133 can be overlaid, operably coupled with, or replace the IPTV system and/or the satellite TV system as another representative embodiment of communication system 100. In this embodiment, the cable TV system 133 can also provide Internet, telephony, and interactive media services. It is contemplated that the subject disclosure can apply to other present or next generation over-the-air and/or landline media content services system.

Some of the network elements of the IPTV media system can be coupled to one or more computing devices 130, a portion of which can operate as a web server for providing web portal services over an Internet Service Provider (ISP) network 132 to wireline media devices 108 or wireless communication devices 116.

It is further contemplated that multiple forms of media services can be offered to media devices over landline technologies such as those described above. Additionally, media services can be offered to media devices by way of a wireless access base station 117 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless network technologies are contemplated by the subject disclosure.

Communication system 100 can also provide for all or a portion of the computing devices 130 to function as a server for communicating with Zigbee-compatible devices in a residence or establishment 102 (herein referred to as server 130). The server 130 can use computing and communication technology to perform function 162, which can include among things, monitoring and responding to sensory data supplied by Zigbee-compatible devices in residence or establishment 102. The media processors 106 and wireless communication devices 116 can be adapted with software functions 164 and 166, respectively, to utilize the services of server 130. Alternatively, or in combination with the foregoing embodiments, media processors 106 and wireless communication devices 116 can perform in whole or in part the functions of the server 130.

Figure 2:
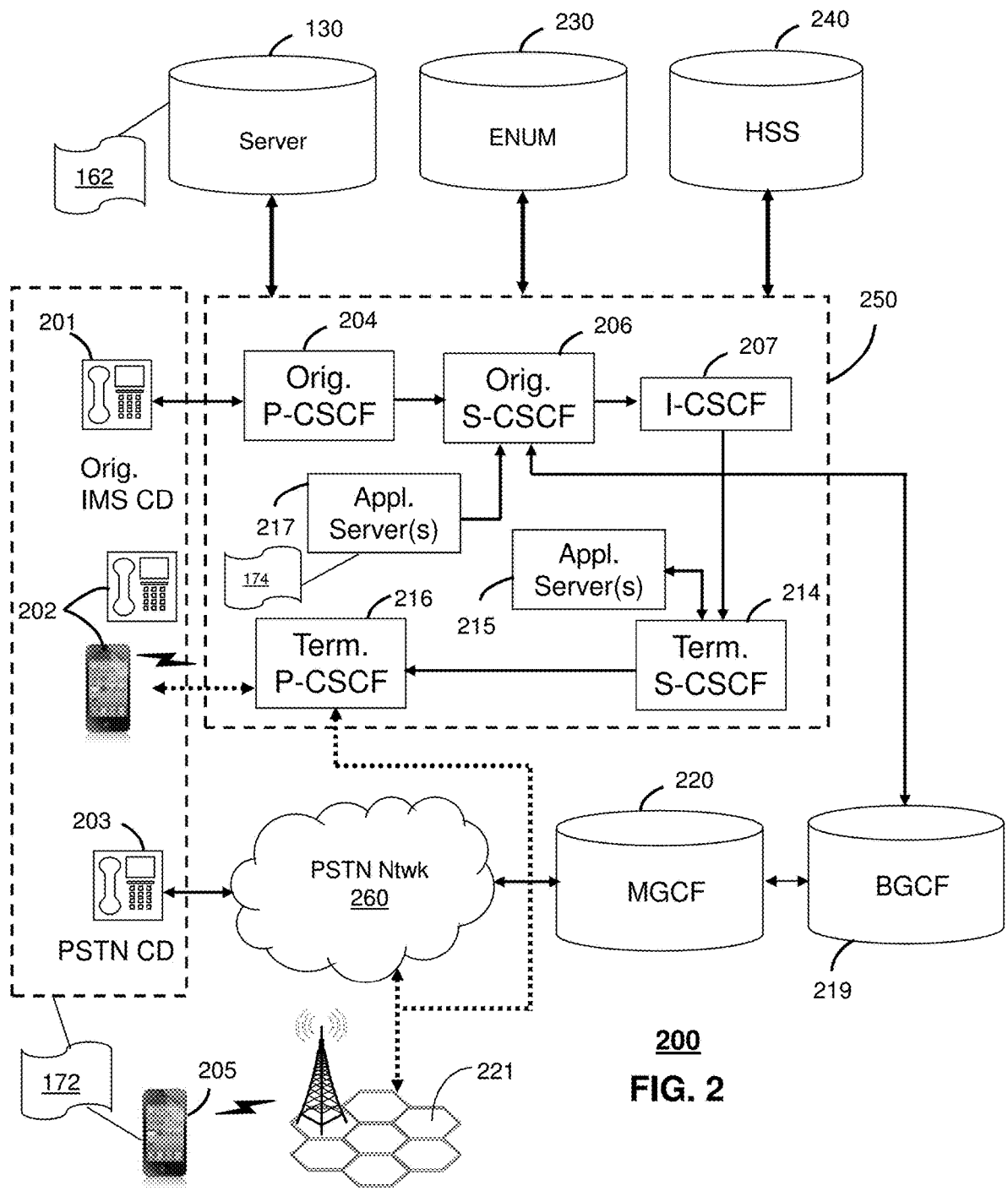

FIG. 2 depicts an illustrative embodiment of a communication system 200 employing an IP Multimedia Subsystem (IMS) network architecture to facilitate the combined services of circuit-switched and packet-switched systems. Communication system 200 can be overlaid or operably coupled with communication system 100 as another representative embodiment of communication system 100.

Communication system 200 can comprise a Home Subscriber Server (HSS) 240, a tElephone NUmber Mapping (ENUM) server 230, and other common network elements of an IMS network 250. The IMS network 250 can establish communications between IMS-compliant communication devices (CDs) 201, 202, Public Switched Telephone Network (PSTN) CDs 203, 205, and combinations thereof by way of a Media Gateway Control Function (MGCF) 220 coupled to a PSTN network 260. The MGCF 220 need not be used when a communication session involves IMS CD to IMS CD communications. A communication session involving at least one PSTN CD may utilize the MGCF 220.

IMS CDs 201, 202 can register with the IMS network 250 by contacting a Proxy Call Session Control Function (P-CSCF) which communicates with an interrogating CSCF (I-CSCF), which in turn, communicates with a Serving CSCF (S-CSCF) to register the CDs with the HSS 240. To initiate a communication session between CDs, an originating IMS CD 201 can submit a Session Initiation Protocol (SIP INVITE) message to an originating P-CSCF 204 which communicates with a corresponding originating S-CSCF 206. The originating S-CSCF 206 can submit the SIP INVITE message to one or more application servers (ASs) 217 that can provide a variety of services to IMS subscribers.

For example, the application servers 217 can be used to perform originating call feature treatment functions on the calling party number received by the originating S-CSCF 206 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 206 can submit queries to the ENUM system 230 to translate an E.164 telephone number in the SIP INVITE message to a SIP Uniform Resource Identifier (URI) if the terminating communication device is IMS-compliant. The SIP URI can be used by an Interrogating CSCF (I-CSCF) 207 to submit a query to the HSS 240 to identify a terminating S-CSCF 214 associated with a terminating IMS CD such as reference 202. Once identified, the I-CSCF 207 can submit the SIP INVITE message to the terminating S-CSCF 214. The terminating S-CSCF 214 can then identify a terminating P-CSCF 216 associated with the terminating CD 202. The P-CSCF 216 may then signal the CD 202 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 2 may be interchangeable. It is further noted that communication system 200 can be adapted to support video conferencing. In addition, communication system 200 can be adapted to provide the IMS CDs 201, 202 with the multimedia and Internet services of communication system 100 of FIG. 1.

If the terminating communication device is instead a PSTN CD such as CD 203 or CD 205 (in instances where the cellular phone only supports circuit-switched voice communications), the ENUM system 230 can respond with an unsuccessful address resolution which can cause the originating S-CSCF 206 to forward the call to the MGCF 220 via a Breakout Gateway Control Function (BGCF) 219. The MGCF 220 can then initiate the call to the terminating PSTN CD over the PSTN network 260 to enable the calling and called parties to engage in voice and/or data communications.

It is further appreciated that the CDs of FIG. 2 can operate as wireline or wireless devices. For example, the CDs of FIG. 2 can be communicatively coupled to a cellular base station 221, a femtocell, a WiFi router, a DECT base unit, or another suitable wireless access unit to establish communications with the IMS network 250 of FIG. 2. The cellular access base station 221 can operate according to common wireless access protocols such as Global System for Mobile (GSM), Code Division Multiple Access (CDMA), Time Division Multiple Access (TDMA), Universal Mobile Telecommunications (UMTS), World interoperability for Microwave (WiMAX), Software Defined Radio (SDR), Long Term Evolution (LTE), and so on. Other present and next generation wireless network technologies are contemplated by the subject disclosure. Accordingly, multiple wireline and wireless communication technologies are contemplated for the CDs of FIG. 2.

It is further contemplated that cellular phones supporting LTE can support packet-switched voice and packet-switched data communications and thus may operate as IMS-compliant mobile devices. In this embodiment, the cellular base station 221 may communicate directly with the IMS network 250 as shown by the arrow connecting the cellular base station 221 and the P-CSCF 216.

It is also understood that alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS and ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

The server 130 of FIG. 1 can also be operably coupled to the second communication system 200 for purposes similar to those described above. It is contemplated by the subject disclosure that server 130 can perform function 162 and thereby communicate with Zigbee-compatible devices. CDs 201, 202, 203 and 205 of FIG. 2 can be adapted as Zigbee-compatible devices, which the server 130 can monitor according to application profiles promulgated by the Zigbee Alliance. Alternatively, the server 130 can be adapted to present to the CDs 201, 202, 203 and 205 monitored sensory data of other Zigbee-compatible devices located in residence 102 or in other remote locations. It is further contemplated that the server 130 can be an integral part of the application server(s) 217 performing function 174, which can be substantially similar to function 162 and adapted to the operations of the IMS network 250.

Figure 3:
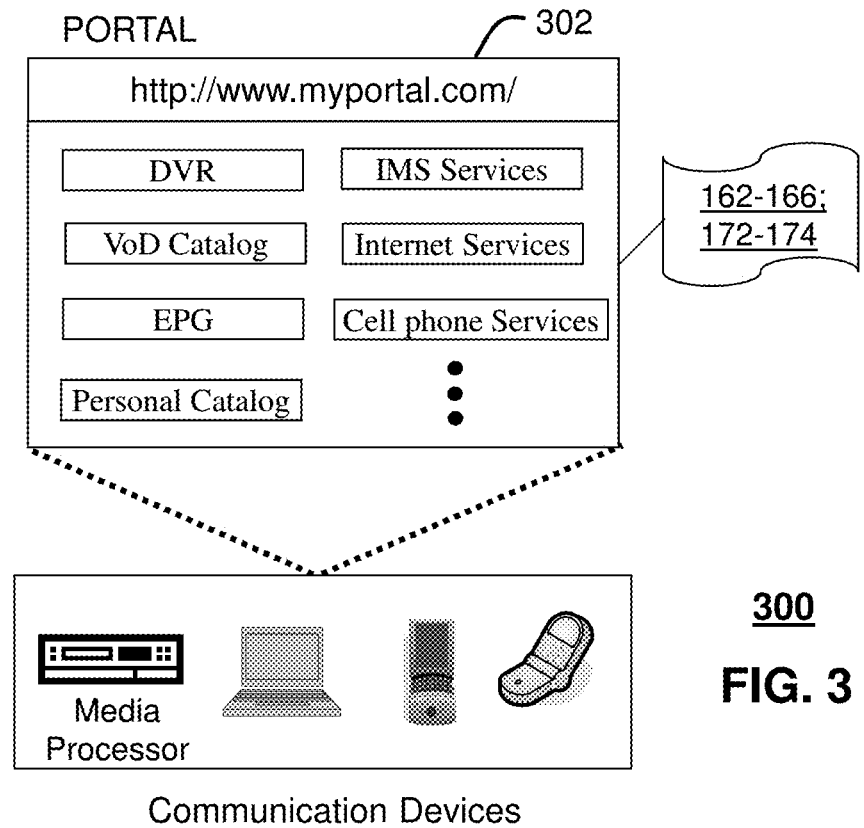
FIG. 3 depicts an illustrative embodiment of a web portal for interacting with the communication systems of FIGS. 1-2.

FIG. 3 depicts an illustrative embodiment of a web portal 302 which can be hosted by server applications operating from the computing devices 130 of the communication system 100 illustrated in FIG. 1. The web portal 302 can be used for managing services of communication systems 100-200. A web page of the web portal 302 can be accessed by a Uniform Resource Locator (URL) with an Internet browser such as Microsoft's Internet Explorer™, Mozilla's Firefox™, Apple's Safari™, or Google's Chrome™ using an Internet-capable communication device such as those described in FIGS. 1-2. The web portal 302 can be configured, for example, to access a media processor 106 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 106. The web portal 302 can also be used for provisioning IMS services described earlier, provisioning Internet services, provisioning cellular phone services, and so on.

It is contemplated by the subject disclosure that the web portal 302 can be utilized to manage and provision software applications 162-164, and 172-174 to adapt these applications as may be desired by subscribers and/or service providers of communication systems 100-200.

Figure 4:
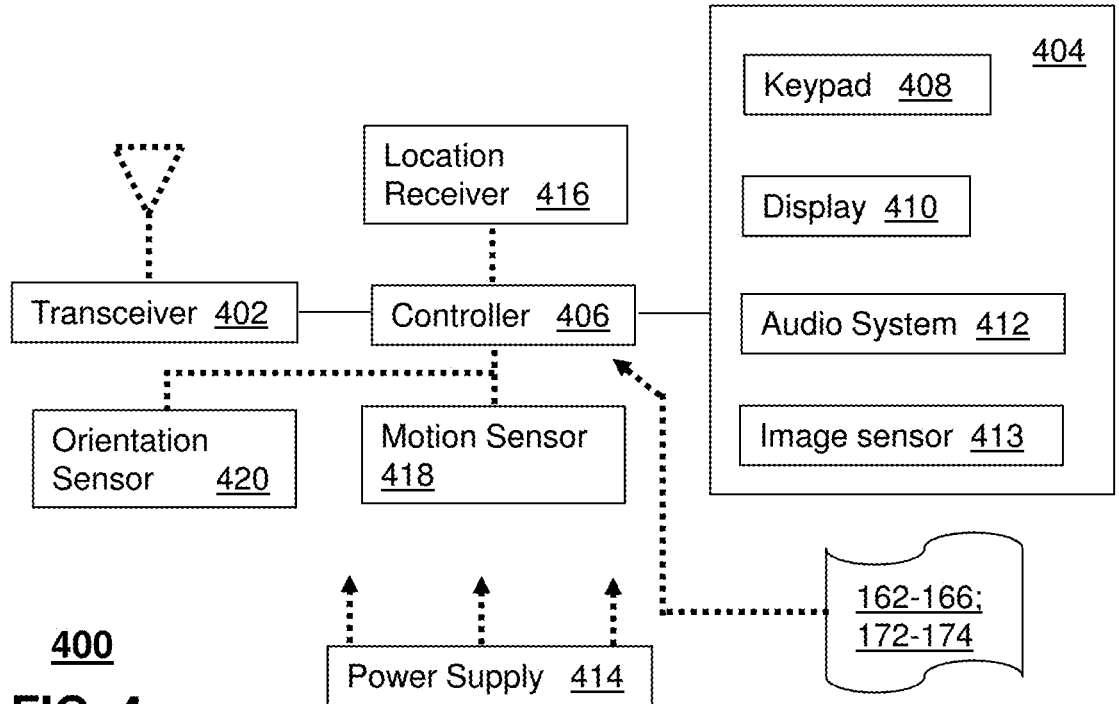
FIG. 4 depicts an illustrative embodiment of a communication device utilized in the communication systems of FIGS. 1-2.

FIG. 4 depicts an illustrative embodiment of a communication device 400. Communication device 400 can serve in whole or in part as an illustrative embodiment of the devices depicted in FIGS. 1-2. The communication device 400 can comprise a wireline and/or wireless transceiver 402 (herein transceiver 402), a user interface (UI) 404, a power supply 414, a location receiver 416, a motion sensor 418, an orientation sensor 420, and a controller 406 for managing operations thereof. The transceiver 402 can support short-range or long-range wireless access technologies such as Bluetooth, ZigBee, WiFi, Digital Enhanced Cordless Telecommunications (DECT), or cellular communication technologies, just to mention a few. Cellular technologies can include, for example, CDMA-1X, UMTS/HSDPA, GSM/GPRS, TDMA/EDGE, EV/DO, WiMAX, software defined radio (SDR), Long Term Evolution (LTE), as well as other next generation wireless communication technologies as they arise. The transceiver 402 can also be adapted to support circuit-switched wireline access technologies (such as PSTN), packet-switched wireline access technologies (such as TCP/IP, VoIP, etc.), and combinations thereof.

The UI 404 can include a depressible or touch-sensitive keypad 408 with a navigation mechanism such as a roller ball, a joystick, a mouse, or a navigation disk for manipulating operations of the communication device 400. The keypad 408 can be an integral part of a housing assembly of the communication device 400 or an independent device operably coupled thereto by a tethered wireline interface (such as a USB cable) or a wireless interface supporting for example Bluetooth. The keypad 408 can represent a numeric keypad commonly used by phones, and/or a QWERTY keypad with alphanumeric keys. The UI 404 can further include a display 410 such as monochrome or color LCD (Liquid Crystal Display), OLED (Organic Light Emitting Diode) or other suitable display technology for conveying images to an end user of the communication device 400. In an embodiment where the display 410 is touch-sensitive, a portion or all of the keypad 408 can be presented by way of the display 410 with navigation features.

The display 410 can use touch screen technology to also serve as a user interface for detecting user input (e.g., touch of a user's finger). As a touch screen display, the communication device 400 can be adapted to present a user interface with graphical user interface (GUI) elements that can be selected by a user with a touch of a finger. The touch screen display 410 can be equipped with capacitive, resistive or other forms of sensing technology to detect much surface area of a user's finger has been placed on a portion of the touch screen display. This sensing information can be used control the manipulation of the GUI elements.

The UI 404 can also include an audio system 412 that utilizes common audio technology for conveying low volume audio (such as audio heard only in the proximity of a human ear) and high volume audio (such as speakerphone for hands free operation). The audio system 412 can further include a microphone for receiving audible signals of an end user. The audio system 412 can also be used for voice recognition applications. The UI 404 can further include an image sensor 413 such as a charged coupled device (CCD) camera for capturing still or moving images.

The power supply 414 can utilize common power management technologies such as replaceable and rechargeable batteries, supply regulation technologies, and charging system technologies for supplying energy to the components of the communication device 400 to facilitate long-range or short-range portable applications. Alternatively, the charging system can utilize external power sources such as DC power supplied over a physical interface such as a USB port. The location receiver 416 can utilize common location technology such as a global positioning system (GPS) receiver capable of assisted GPS for identifying a location of the communication device 400 based on signals generated by a constellation of GPS satellites, thereby facilitating common location services such as navigation. The motion sensor 418 can utilize motion sensing technology such as an accelerometer, a gyroscope, or other suitable motion sensing to detect motion of the communication device 400 in three-dimensional space. The orientation sensor 420 can utilize orientation sensing technology such as a compass to detect the orientation of the communication device 400 (North, South, West, East, combined orientations thereof in degrees, minutes, or other suitable orientation metrics).

The communication device 400 can use the transceiver 402 to also determine a proximity to a cellular, WiFi, Bluetooth, or other wireless access points by common sensing techniques such as utilizing a received signal strength indicator (RSSI) and/or a signal time of arrival (TOA) or time of flight (TOF). The controller 406 can utilize computing technologies such as a microprocessor, a digital signal processor (DSP), and/or a video processor with associated storage memory such as Flash, ROM, RAM, SRAM, DRAM or other storage technologies.

Other components not shown in FIG. 4 are contemplated by the subject disclosure. For instance, the communication device 400 can include a reset button (not shown). The reset button can be used to reset the controller 406 of the communication device 400. In yet another embodiment, the communication device 400 can also include a factory default setting button positioned below a small hole in a housing assembly of the communication device 400 to force the communication device 400 to re-establish factory settings. In this embodiment, a user can use a protruding object such as a pen or paper clip tip to reach into the hole and depress the default setting button.

The communication device 400 as described herein can operate with more or less components described in FIG. 4. These variant embodiments are contemplated by the subject disclosure.

The communication device 400 can be adapted to perform the functions of the media processor 106, the media devices 108, or the portable communication devices 116 of FIG. 1, as well as the IMS CDs 201-202 and PSTN CDs 203-205 of FIG. 2. It will be appreciated that the communication device 400 can also represent other common devices that can operate in communication systems 100-200 of FIGS. 1-2 such as a gaming console and a media player.

It is also contemplated that the communication device 400 shown in FIG. 4 or portions thereof can serve as a representation of one or more of the devices of communication systems 100-200. It is further contemplated that the controller 406 can be adapted in various embodiments to perform functions 162-164 and 172-174 described earlier.

Figure 5:
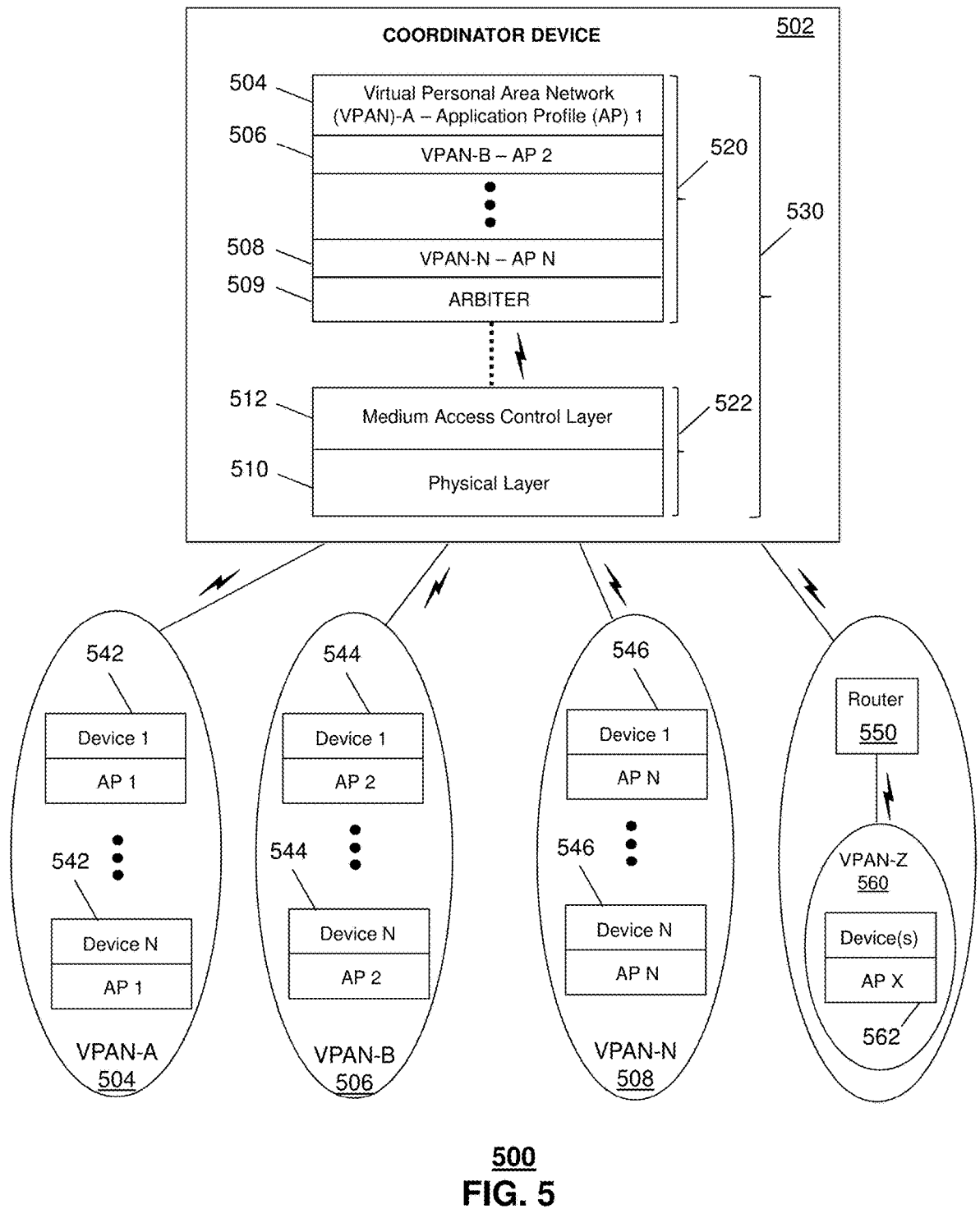
FIG. 5 depicts an illustrative embodiment of a communication system.

FIG. 5 depicts an illustrative embodiment of a communication system 500 that can be overlaid or operably coupled with communication systems 100-300 as another representative embodiment of these communication systems. Communication system 500 can comprise a coordinator device 502 communicatively coupled to a plurality of devices 542, 544, 546 and 562 operating in virtual personal area networks (VPANs). The component parts of the coordinator device 502 can utilize in whole or in part the computing and communication technologies described above for communication device 400 of FIG. 4.

In one embodiment, the functions of the coordinator device 502 can be subdivided into an application manager 520 which manages VPANs, and a communications interface 522 which manages communications between the application manager 520 and the VPANs. Each VPAN of the application manager 520 can include a network layer and an application layer, which operates in part according to the specifications promulgated by the ZigBee Alliance, and which may be adapted to accomplish the objectives of the subject disclosure. The communications interface 522 can comprise a physical layer 510 and a medium access control layer 512 that operates according to the specifications defined by the working group of the Institute of Electrical and Electronics Engineers (IEEE) for the 802.15.4 standard.

In one embodiment, the functions of the application manager 520 can operate from an infrastructure device such as server 130 shown in FIGS. 1 and 2. In another embodiment, the functions of the application manager 520 can operate from the gateway 104 or the media processor 106 of FIG. 1. In one embodiment, the functions of the application manager 520 can operate from the application server 217 of FIG. 2. In one embodiment, the functions of the applicator manager 520 can operate from more than one computing device. For example, VPAN-A 504 can operate from media processor 106, while VPAN-B 506 can operate from gateway 104. Generally, it is not necessary for VPANs to process sensory data in real-time. Accordingly, VPANs (A-N) 504-508 of the application manager 520 can operate from one or more independently operated computing devices each sharing the communications interface 522. Although portions of the application manager 520 can be decentralized, in one embodiment the application manager 520 and the communications interface 522 can be housed into a single computing device 530. In this embodiment, the coordinator device 502 can be placed in residence 102 as a standalone device. Alternatively, the application manager 520 and the communications interface 522 can be integrated in a device such as the media processor 106 or gateway 104 located in the residence 102. In this embodiment, each VPAN 504, 506, and 508 can operate as an independent software process. Thus, each VPAN software process that is executed by the single computing device 530 can operate independent of another VPAN executed by the single computing device 530. The independent operation of VPANs can be implemented by a multitasking operating system executed by the single computing device 530 that manages utilization of computing resources used by the VPANs.

The application manager 520 can include an arbiter 509 to arbitrate between two or more VPANs requesting usage of the resources of the communications interface 522. In one embodiment, the arbiter 509 can be adapted to provide each VPAN equal access to the communications interface 522. This can be performed by assigning a synchronous time slot to each VPAN, which would enable each VPAN to gain equal access to the communications interface 522. Alternatively, the arbiter 509 can be adapted to provide each VPAN asynchronous and asymmetric access to the communications interface 522 based on a predetermined arbitration scheme. For example, the arbiter 509 can be configured to provide each VPAN a different priority level so that when simultaneous requests are made by two or more VPANs, the VPAN with the highest priority is given access.

To avoid a VPAN from blocking other VPANs access to the resources of the communications interface 522, the arbiter 509 can be configured to apply a time limit on each VPAN's usage of the communications interface 522 so that other VPANs can be given an opportunity to access the communications interface 522. Other arbitration techniques can be applied. For example, the arbiter 509 can also be configured to interpret sensory data received from devices operating in each VPAN and assess how to assign a particular VPAN priority and/or time limits for utilizing the communications interface 522 based on the importance given by the arbitrator 509 to the received sensory data.

Each VPAN of the application manager 520 can be adapted to operate according to a specific application profile defined and promulgated by the ZigBee Alliance. Possible application profiles can include a Home Automation application profile, a Smart Energy profile application profile, a Telecommunications application profile, a Health Care application profile, a Remote Control application profile, a Building Automation application profile, a Retail Services application profile, an Input Device application profile, a Telecom Services application profile, a 3D Sync application profile, a Network Devices application profile, derivatives thereof, or combinations thereof. VPAN-A 504, for example, can be adapted to the Home Automation application profile defined by the ZigBee Alliance, while VPAN-B 506 can be adapted to the Health Care application profile defined by the ZigBee Alliance. Other application profiles generated by the ZigBee Alliance, or other standards bodies are contemplated by the subject disclosure.

Devices 542 can be adapted to operate according to application profile 1 (e.g., the Home Automation application profile) of VPAN-A 504. Devices 544 can be adapted to operate according to application profile 2 (e.g., the Remote Control application profile). This structure can be repeated for other VPANs such as depicted by devices 546, which operate according to application profile N (e.g., the Health Care application profile). It should be noted that the devices 542 operating according to application profile 1 are able to operate only in a VPAN of the same application profile. According, devices 542 unable to operate in VPAN-B 506 or VPAN-N 508. Similarly, devices 544 operating according to application profile 2 are unable to operate in VPAN-A 504 or VPAN-N 508, and devices 546 operating according to application profile N are unable to operate in VPAN-A 504 or VPAN-B 506. Accordingly, each of the VPANs of the application manager 522 are adapted to communicate only with devices of a compatible application profile.

The application manager 522 can also be configured to detect a router 550 that is compatible with ZigBee protocols. The router 550 can be detected by any one of the VPANs 504-508. In another embodiment, the arbiter 509 can be configured to detect the router 550. The router 550 can be coupled to VPAN-Z 560 with one or more devices 562 operating according to application profile X. If application profile X matches to one of the application profiles of the VPANs 504 and 506, then the matched VPAN of the application manager 522 can be configured to establish communications with the router 550 and thereby link to VPAN-Z 560 and devices 562 operating within this network.

Devices 542, 544, 546, and 562 can represent sensors coupled to appliances, remote controllers, consumer electronic devices, security systems, and so on. Each sensor can provide monitoring data to a corresponding VPAN of the application manager 522. The sensors can also be controlled by a VPAN of the application manager 522. Each VPAN can be configured to collect and present monitored information to a user by way of a computer monitor, mobile phone, or other suitable communication device communicatively coupled to the VPAN (e.g., via the Internet) and capable of displaying a graphical user interface (GUI). The recipient of the monitored information can be provided with control elements in the GUI to control the operation of the sensor.

For example, the recipient can turn off lights in an area of the residence 102, turn on or off an air conditioner, switch between webcam monitors, assert an alarm, and so on. Each VPAN of the application manager 522 can also be configured with automatic triggers to respond to sensory data from the sensors. For example, a VPAN can be configured by a user by way of portal 302 to turn on lights when a sensor detects a decrease in luminescence in a particular area of the residence. The VPAN can also be configured by the user to turn off certain appliances such as a water heater when members of a household are not detected for an extended period of time. Other manual and automation techniques for monitoring and/or processing monitored data are contemplated by the subject disclosure.

Figure 6:
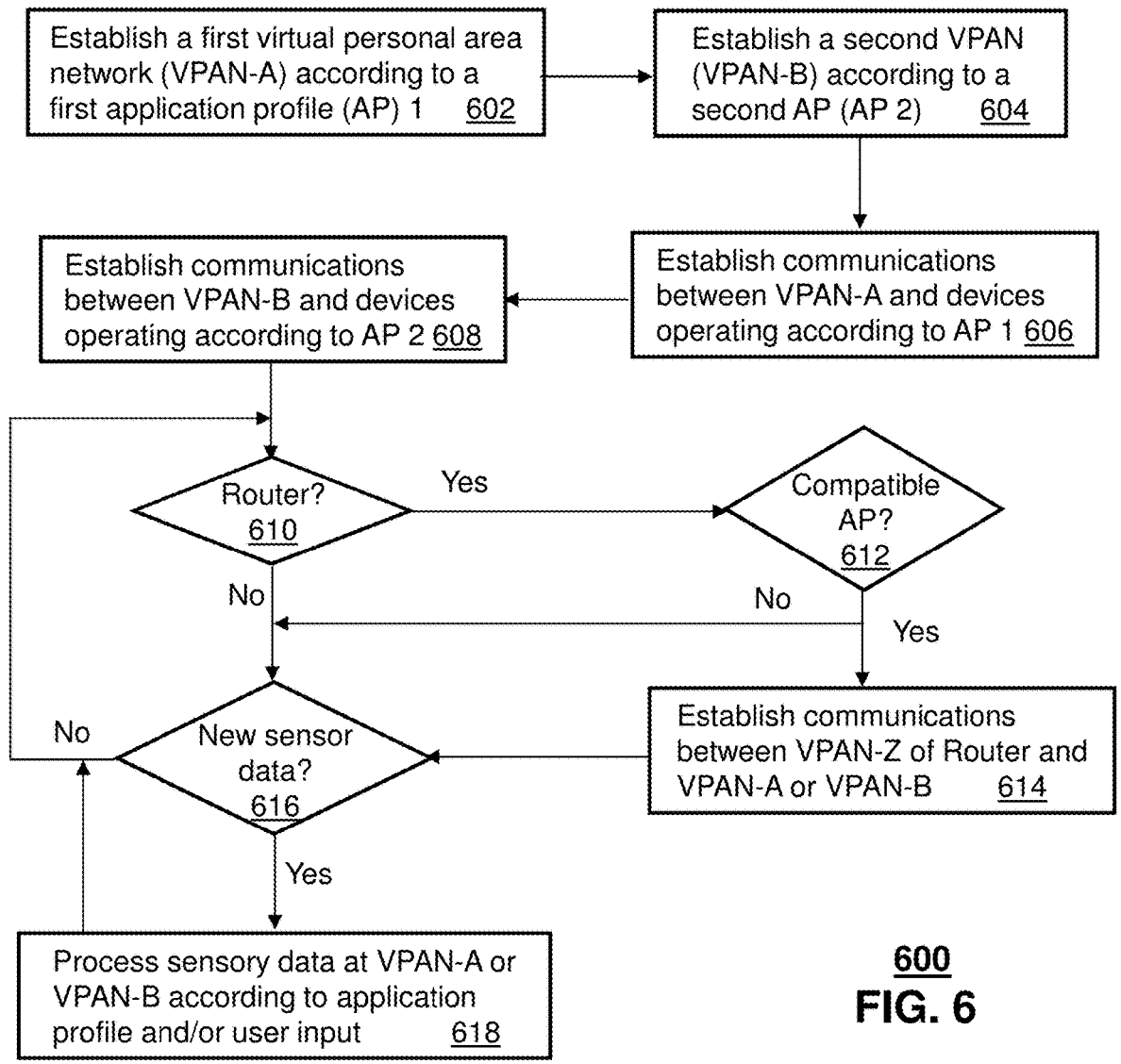
FIG. 6 depicts an illustrative embodiment of a method operating in portions of the systems described in FIGS. 1-5.

FIG. 6 depicts an illustrative method 600 that operates in portions of the devices of FIGS. 1-5. Method 600 can begin with step 602 in which a first VPAN (e.g., VPAN-A 504) is established by the application manager 522 according to a corresponding first application profile. This step can represent, for example, a Home Automation VPAN being executed by the application manager 522. In step 604, the application manager 522 can establish a second VPAN (e.g., VPAN-B 506) according to a second application profile. This step can represent, for example, a Health Care VPAN being executed by the application manager 522. VPAN-A 504 can then establish communications in step 606 with devices 542 operating according to the first application profile (e.g., devices operating according to the Home Automation application profile). In step 608, the VPAN-B 506 can establish communications with devices 544 operating according to the second application profile (e.g., devices operating according to the Health Care application profile).

In step 610, VPAN-A 504 and/or VPAN-B 506, or the arbiter 509, can monitor for the presence of a router 550 according to device discovery protocols defined by the ZigBee Alliance. If a router 550 is discovered, VPAN-A 504 and/or VPAN-B 506, or the arbiter 509 can determine if the router 550 is coupled to a VPAN which is operating according to an application profile that is compatible with either VPAN-A 504 or VPAN-B 506. If VPAN-Z 560 is operating according to an application profile X, which is compatible with the application profile of VPAN-A 504, then VPAN-A 504 and VPAN-Z 560 can establish a communication link therebetween by way of the router 560 in step 614.

This enables VPAN-A 504 of the coordinator device 502 to manage devices 562 operating from VPAN-Z. If VPAN-Z is not compatible with either of VPAN-A 504 or VPAN-B 506, then the router 550 is ignored. At step 616, each of VPAN-A 504 and VPAN-B 506 monitor sensory data from devices 542 and 544. In one embodiment, this step can represent sensory data transmitted automatically by the devices 542 and 544 to VPAN-A 504 or VPAN-B 506. In another embodiment, this step can represent sensor data polled by VPAN-A 504 and VPAN-B 506, respectively. Upon receiving sensory data from devices 542 or 544, VPAN-A 504 or VPAN-B 506 can be configured to process the sensory data according to a profile created by way of portal 302, and/or by user input received from selections made by way of a GUI presented to the user at a communication device such as a television display controlled by a media processor, a computer, mobile phone or laptop computer, or other suitable communication device communicatively coupled to VPAN-A 504 or VPAN-B 506 by way of the communication systems 100-200 of FIGS. 1-2. Once the sensory data has been processed, steps 610 through 618 are repeated.

Method 600 discloses a coordinator device 502 which is capable of managing multiple personal area networks (PAN) configured with differing application profiles, which overcomes a limitation of prior art ZigBee systems.

Upon reviewing the aforementioned embodiments, it would be evident to an artisan with ordinary skill in the art that said embodiments can be modified, reduced, or enhanced without departing from the scope and spirit of the claims described below. For example, the application manager 522 of FIG. 5 can be adapted to operate in a mobile phone, portable computer, or other suitable communication device. Method 600 and the communication system 500 of FIG. 5 can also be configured to operate with next generation application profiles defined by the ZigBee Alliance or proprietary standards as they may arise. Method 600 and the communication system 500 of FIG. 5 can further be adapted to operate with other virtual personal area networks which may not be compatible with the ZigBee standard. Other embodiments are contemplated by the subject disclosure.

Figure 7:
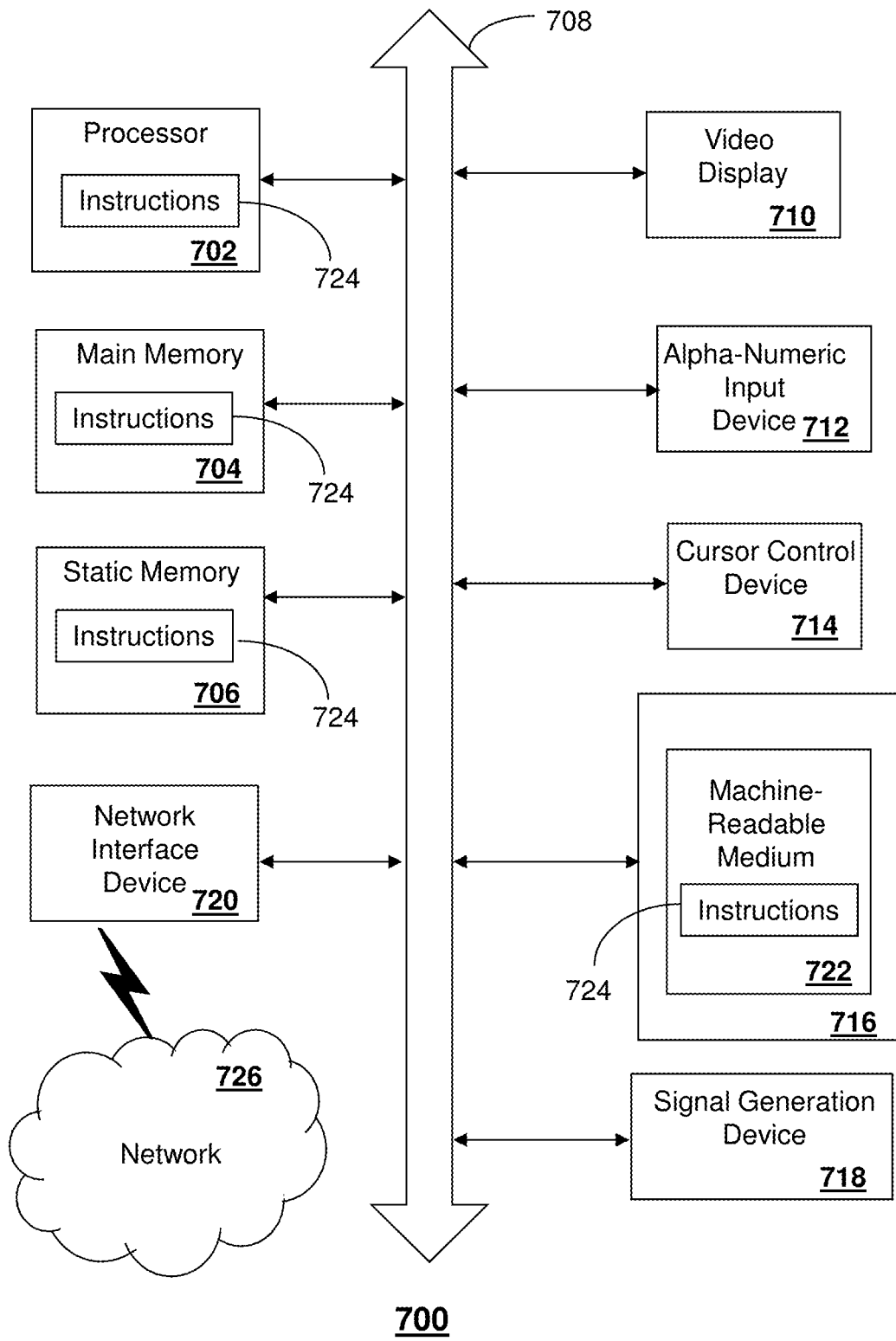
FIG. 7 is a diagrammatic representation of a machine in the form of a computer system within which a set of instructions, when executed, may cause the machine to perform any one or more of the methods described herein.

FIG. 7 depicts an illustrative diagrammatic representation of a machine in the form of a computer system 700 within which a set of instructions, when executed, may cause the machine to perform any one or more of the methods discussed above. One or more instances of the machine can operate, for example, as the server 130, media processor 106, the CDs 201, 202, 203 and 205, the CSCFs, the application servers, the coordinator device 502, the router 560, devices 542, 544, 546, 562, and other devices or components of FIGS. 1-5. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 700 may include a processor 702 (e.g., a central processing unit (CPU), a graphics processing unit (GPU, or both), a main memory 704 and a static memory 706, which communicate with each other via a bus 708. The computer system 700 may further include a video display unit 710 (e.g., a liquid crystal display (LCD), a flat panel, or a solid state display. The computer system 700 may include an input device 712 (e.g., a keyboard), a cursor control device 714 (e.g., a mouse), a disk drive unit 716, a signal generation device 718 (e.g., a speaker or remote control) and a network interface device 720.

The disk drive unit 716 may include a tangible computer-readable storage medium 722 on which is stored one or more sets of instructions (e.g., software 724) embodying any one or more of the methods or functions described herein, including those methods illustrated above. The instructions 724 may also reside, completely or at least partially, within the main memory 704, the static memory 706, and/or within the processor 702 during execution thereof by the computer system 700. The main memory 704 and the processor 702 also may constitute tangible computer-readable storage media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

While the tangible computer-readable storage medium 622 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth, WiFi, Zigbee), and long-range communications (e.g., WiMAX, GSM, CDMA, LTE) are contemplated for use by computer system 700.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, are contemplated by the subject disclosure.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
    initiating, by a processing system including a processor, a first virtual personal area network according to a first application profile, wherein the first application profile is based on a first protocol specification;
    initiating, by the processing system, a second virtual personal area network according to a second application profile, wherein the second application profile is based on a second protocol specification;
    providing, by the processing system, a communications interface comprising a physical layer and a medium access control layer, wherein the first virtual personal area network and the second virtual personal area network share the medium access control layer and the physical layer of the communications interface; and
    providing, by the processing system, access to the communication interface to the first virtual personal area network and the second virtual personal area network according to an arbitration scheme.

2. The method of claim 1, wherein the first virtual personal area network and the second virtual personal area network are respectively associated with a first sensor and a second sensor.

3. The method of claim 2, further comprising:
    receiving, by the processing system, first sensory data and second sensory data from the first sensor and the second sensor respectively;
    interpreting, by the processing system in accordance with the arbitration scheme, the first sensory data and the second sensory data to determine a relative importance of the first sensory data and the second sensory data; and
    assigning, by the processing system, a priority for accessing the communication interface to each of the first virtual personal area network and the second virtual personal area network based on the relative importance of the first sensory data and the second sensory data.

4. The method of claim 2, wherein the first sensor and second sensor respectively provide monitoring data regarding devices of the first virtual personal area network and the second virtual personal area network.

5. The method of claim 1, wherein in accordance with the arbitration scheme, the first virtual personal area network and the second virtual personal area network are provided equal access to the communication interface.

6. The method of claim 5, wherein the arbitration scheme comprises assigning synchronous time slots to each of the first virtual personal area network and the second virtual personal area network.

7. The method of claim 1, wherein asynchronous and asymmetric access to the communication interface is provided to the first virtual personal area network and the second virtual personal area network.

8. The method of claim 7, wherein the arbitration scheme comprises assigning a different priority level to each of the first virtual personal area network and the second virtual personal area network.

9. The method of claim 1, wherein the arbitration scheme comprises assigning a time limit for accessing the communication interface to each of the first virtual personal area network and the second virtual personal area network.

10. The method of claim 1, further comprising:
   detecting, by the processing system, a router communicatively coupled to a third virtual personal area network; and
   initiating, by the processing system, communications with the router to enable communications between the third virtual personal area network and the first virtual personal area network, the second virtual personal area network, or both.

11. A machine-readable medium comprising executable instructions that, when executed by a processing system including a processor, facilitate performance of operations comprising:
   initiating a first virtual personal area network according to a first application profile, wherein the first application profile is based on a first protocol specification;
   initiating a second virtual personal area network according to a second application profile, wherein the second application profile is based on a second protocol specification;
   providing a communications interface comprising a physical layer and a medium access control layer, wherein the first virtual personal area network and the second virtual personal area network share the medium access control layer and the physical layer of the communications interface; and
   providing access to the communication interface to the first virtual personal area network and the second virtual personal area network according to a predetermined arbitration scheme.

12. The machine-readable medium of claim 11, wherein the first virtual personal area network and the second virtual personal area network are respectively associated with a first sensor and a second sensor.

13. The machine-readable medium of claim 12, further comprising:
   receiving, by the processing system, first sensory data and second sensory data from the first sensor and the second sensor respectively;
   interpreting, by the processing system in accordance with the predetermined arbitration scheme, the first sensory data and the second sensory data to determine a relative importance of the first sensory data and the second sensory data; and
   assigning, by the processing system, a priority for accessing the communication interface to each of the first virtual personal area network and the second virtual personal area network based on the relative importance of the first sensory data and the second sensory data.

14. The machine-readable medium of claim 11, wherein in accordance with the predetermined arbitration scheme, the first virtual personal area network and the second virtual personal area network are provided equal access to the communication interface.

15. The machine-readable medium of claim 11, wherein asynchronous and asymmetric access to the communication interface is provided to the first virtual personal area network and the second virtual personal area network.

16. A device comprising:
   a processing system including a processor; and
   a memory that stores executable instructions that, when executed by the processing system, facilitate performance of operations comprising:
      initiating a first virtual personal area network according to a first application profile;
      initiating a second virtual personal area network according to a second application profile;
      providing a communications interface comprising a physical layer and a medium access control layer, wherein the first virtual personal area network and the second virtual personal area network share the medium access control layer and the physical layer of the communications interface; and
      providing access to the communication interface to the first virtual personal area network and the second virtual personal area network according to an arbitration scheme.

17. The device of claim 16, wherein the first application profile and the second application profile are respectively defined by a first protocol specification and a second protocol specification.

18. The device of claim 16, wherein the first virtual personal area network and the second virtual personal area network are respectively associated with a first sensor and a second sensor.

19. The device of claim 18, wherein the operations further comprise:
   receiving first sensory data and second sensory data from the first sensor and the second sensor respectively;
   interpreting, in accordance with the arbitration scheme, the first sensory data and the second sensory data to determine a relative importance of the first sensory data and the second sensory data; and
   assigning a priority for accessing the communication interface to each of the first virtual personal area network and the second virtual personal area network based on the relative importance of the first sensory data and the second sensory data.

20. The device of claim 16, wherein the operations further comprise:
   detecting a router communicatively coupled to a third virtual personal area network; and
   initiating communications with the router to enable communications between the third virtual personal area network and the first virtual personal area network, the second virtual personal area network, or both.

* * * * *